United States Patent [19]

Szabo

[11] 4,091,179
[45] May 23, 1978

[54] VENT SYSTEM WITH FLAME ARRESTING CAPABILITY

[75] Inventor: Joseph F. Szabo, North Olmsted, Ohio

[73] Assignee: ESB Incorporated, Philadelphia, Pa.

[21] Appl. No.: 787,018

[22] Filed: Apr. 13, 1977

[51] Int. Cl.² .............................................. H01M 2/12
[52] U.S. Cl. ....................................... 429/84; 429/89; 220/367
[58] Field of Search ....................... 429/89, 82, 84, 72; 220/367, 373; 431/356

[56] References Cited

U.S. PATENT DOCUMENTS

| | | | |
|---|---|---|---|
| 3,879,227 | 4/1975 | Hennen | 429/86 |
| 3,907,605 | 9/1975 | Melone | 429/89 |
| 3,915,752 | 10/1975 | Gross | 429/86 |
| 3,992,226 | 11/1976 | Godshalk | 429/89 |
| 4,010,044 | 3/1977 | Schaumburg | 429/82 |

Primary Examiner—Anthony Skapars

Attorney, Agent, or Firm—Gary V. Pack

[57] ABSTRACT

A vent system for an electric storage battery having a flame arresting capability to minimize the possibility of battery explosion from ignition of explosive gases flowing from the vent plug. The vent system includes a vent plug design having an internal restricted passage and a flange extending around the top of the vent plug which cooperates with the upper surface of the battery cover to create an explosion chamber, so that in the event the explosive gases being vented are ignited, the resulting controlled explosion extinguishes the flame. One embodiment is provided wherein the top surface of the plug is flush with the top of the battery cover. A modified vent well is required for this embodiment, whereby the vent well in the battery cover has a recessed shoulder to receive the flange portion of the vent plug. A second embodiment is also provided wherein the vent plug can be used on conventional battery cover designs, but is not flush with the top of the battery cover.

9 Claims, 9 Drawing Figures

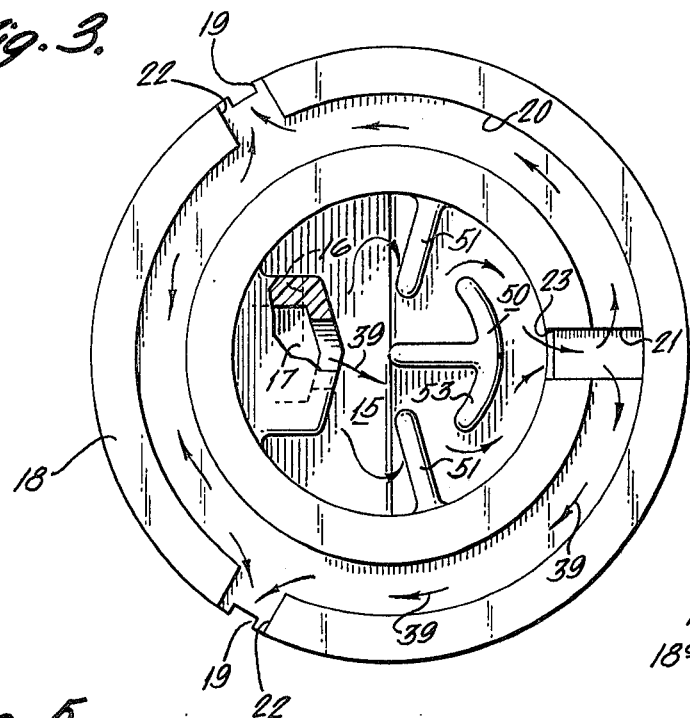
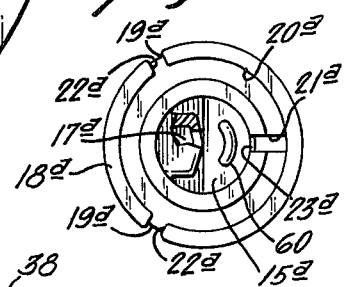
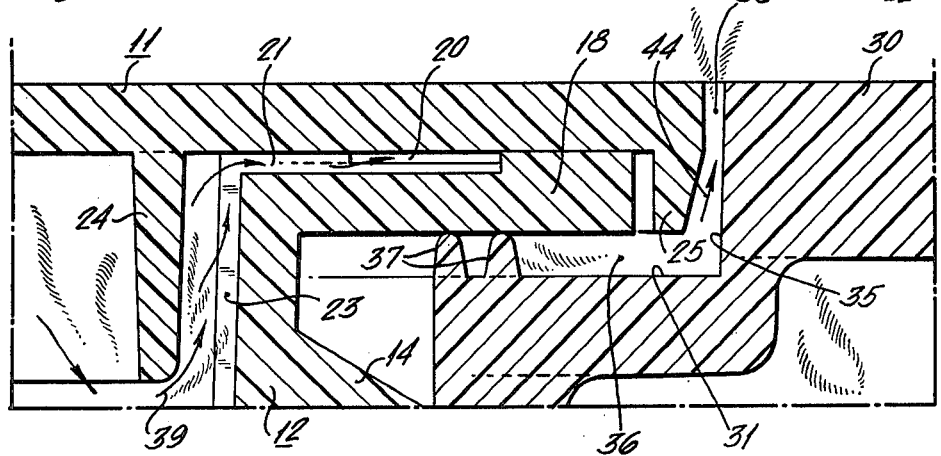
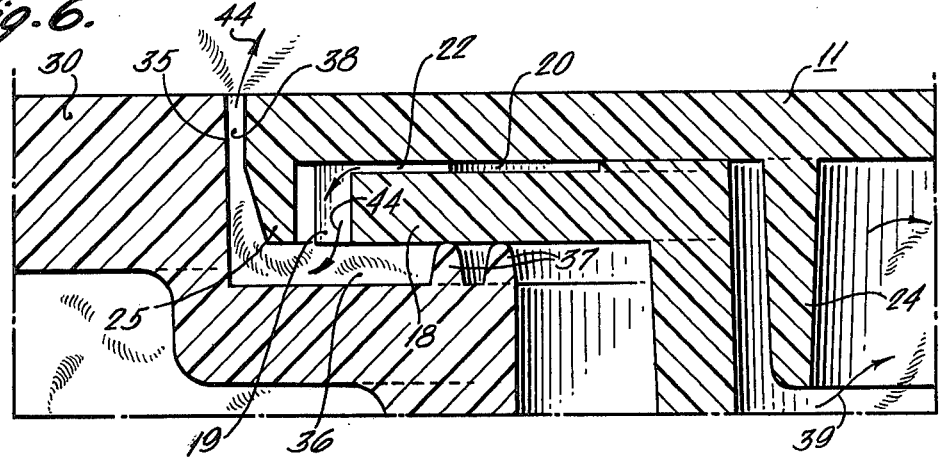

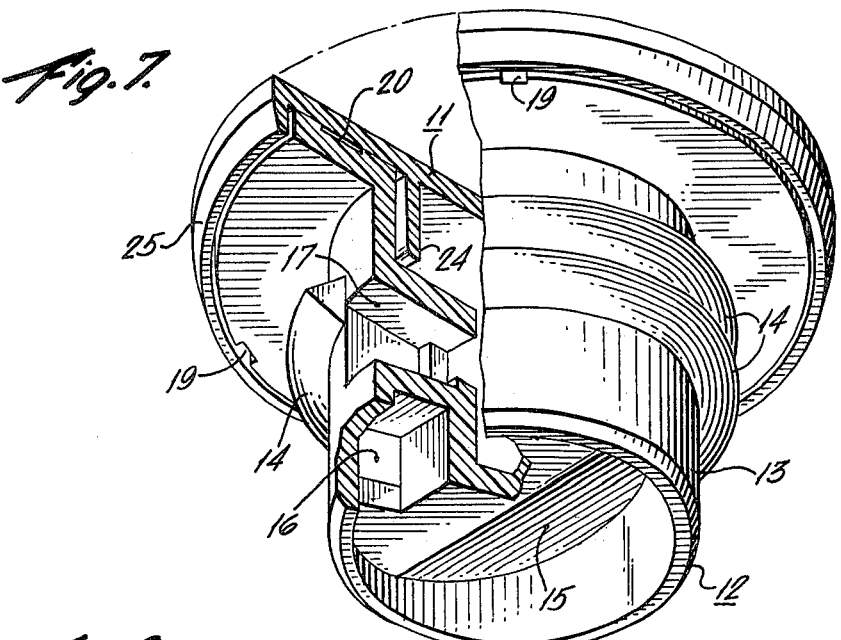
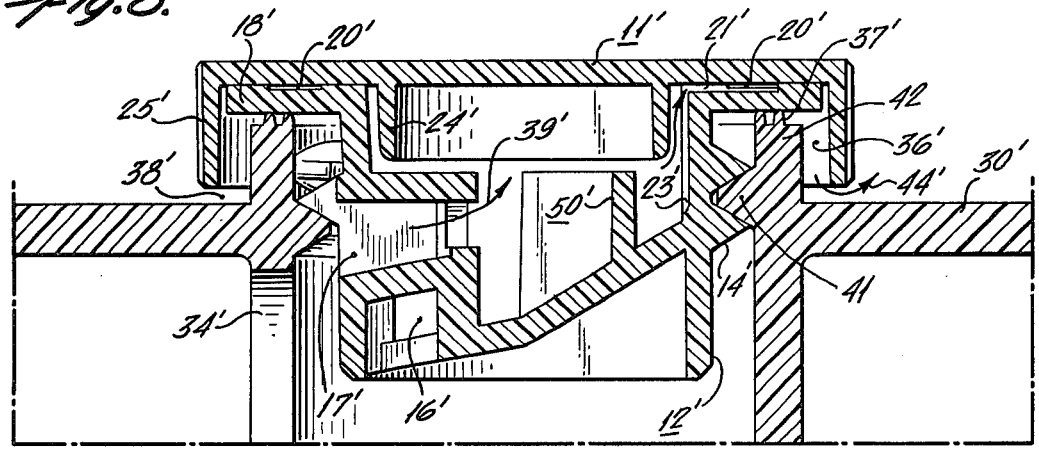
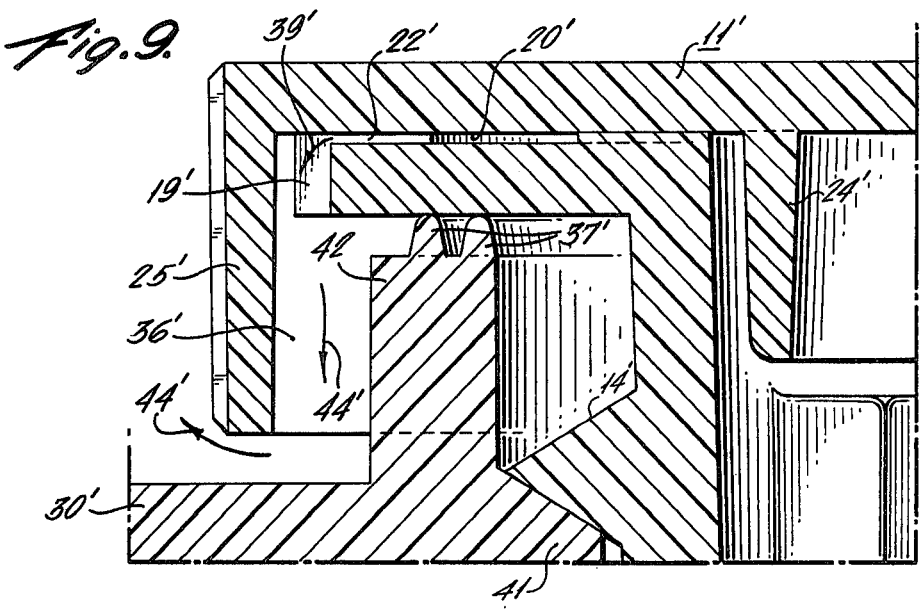

VENT SYSTEM WITH FLAME ARRESTING CAPABILITY

CROSS REFERENCE TO RELATED APPLICATIONS

This application includes claims directed to the first embodiment of the flame arresting system and is related to two copending patent applications, one entitled "Vent Plug System for Batteries", by Jeffrey S. Leeson and Joseph F. Szabo, Ser. No. 787,020 and a second one entitled "Vent System With Flame Arresting Capabilities", by Albert L. Fox, Joseph F. Szabo, and Jeffrey S. Leeson, Ser. No. 787,019 both filed of even date herewith. The former copending application relates to the design of the internal components of the disclosed vent plug system related to electrolyte seapration, and the latter copending application includes claims directed at the second embodiment of the flame arresting system.

BACKGROUND OF THE INVENTION

This invention relates to a vent system for an electric storage battery, and more specifically to a vent system with a flame arresting system having means for preventing the transmission of a flame through the vent system and into the battery and means for extinguishing the flame before it reaches the inside of the battery.

In reading the following disclosure, it should be noted that the invention disclosed and claimed herein, and the discussion concerning it, are applicable to many kinds of battery systems, and that the references to applications in the area of automotive batteries and maintenance free automotive batteries are made to illustrate possible uses of the invention, and not for the purpose of limiting the scope of the claimed invention.

The chemical reactions which take place within batteries can produce explosive gases, which are usually relieved through a vent system. In the event a spark should occur in the area of the battery vent plugs, such as when a connection is made to the battery, the gases being emitted from the battery can be easily ignited. One time when this situation occurs is when a battery is being charged or is being overcharged. Should the flame travel through the vent system, the battery itself would explode.

Several prior art systems have addressed this problem. A few systems use apertures through which the gases escape, which are small enough to prevent the flame from entering the vent plug. Other systems utilize restricted passageways formed inside the vent plug, which are not large enough to permit combustion or the transmission of a flame. Still other systems use porous diffusors or other similar devices which function in a manner similar to a fire screen. While these systems may extinguish a flame adequately, if one occurs, permanent damage may be done to the vent plug, thereby impairing their effectiveness or even requiring its replacement.

Another trend in solving the explosion prevention problem has been to create a chamber wherein a controlled explosion will take place in the event the gases expelled through the vent plug are ignited. One such example is U.S. Pat. No. 3,879,227, issued to Hennen, wherein a porous diffuser prevents passage of the flame through the vent plug so that a controlled explosion takes place in the explosion chamber immediately outside the porous diffuser, thereby extinguishing the flame. Potential problems when using a ceramic porous diffuser include increased costs and risks that the diffuser will eventually clog up.

When designing a vent system for use with an automotive maintenance free battery, other considerations are important. An automotive maintenance free battery is designed so that throughout its normal life, no attention is required by the user, such as the addition of water to the individual cells. As a result, most manufacturers have the liquid level of the electrolyte as high as practically possible, without interfering with the venting operations, so as to provide an adequate reserve of electrolyte throughout the life of the battery. In an effort to maximize the liquid level for a given battery, the vent plugs should be made so that the distance they extend into the vent well is minimized. This problem is complicated further since marketing considerations often require the single vent plug to be flush with the top of the battery cover, so as to provide a "maintenance free" look.

SUMMARY OF THE INVENTION

In accordance with a first embodiment, an improved vent system having flame arresting capabilities is disclosed which overcomes the above noted problems with the prior art by utilizing a specially designed vent plug assembly to cooperate with the top of the battery cover to create an explosion chamber which acts in cooperation with a restricted passage in the vent plug to prevent battery explosions. When gases flowing from the vent plug are ignited, a controlled explosion is permitted to take place in the explosion chamber, thereby extinguishing the flame. In addition, this embodiment is designed so that the top of the vent plug is flush with the top of the battery cover.

The vent plug for the first embodiment vent system has a cylindrically shaped, body, portion which extends into the vent well, with apertures located in its lower portion to enable gases to enter the plug for venting to the atmosphere. The upper surface of the vent plug extends outward from the body portion to form a flange portion. Fluid communication means, including a restricted passage from the inside of the vent plug to points on the lower, outside edge of the flange portion, is provided for release of gases through the vent plug.

The vent well in the battery cover is designed to have a recessed shoulder around its opening for receiving the flange portion of the vent plug, so that the top surface of the vent plug remains flush with the top of the battery cover. The coacting surface areas of the flange portion and the recessed shoulder are designed to create the explosion chamber.

A vent system with the second embodiment of the flame arrestor has a vent plug assembly designed for use on batteries having conventional battery covers to accomplish the same flame arresting result. In this embodiment, the vent plug extends above the battery cover and has a skirt extending down from the outer edge of the flange portion, nearly to the top of the battery cover. The enclosed space around the vent well chimney, bounded by the flange portion and its skirt, and the top of the battery cover, forms the explosion chamber.

These vent plug designs provide flame arresting protection without compromising the design criteria for maintenance free batteries and requirements for virtually problem free use as well as the considerations for marketing. In addition, the design is such that the vent system is usually not destroyed and needs not to be replaced in the event of an explosion. It can also be mass produced using conventional injection molding processes with conventional plastics.

A better understanding of the invention and its advantages can be seen in the following description of the drawings and preferred embodiments.

DESCRIPTIONS OF THE DRAWINGS AND PREFERRED EMBODIMENTS

FIG. 3 is a horizontal section taken along the line 3—3 of the vent plug in FIG. 2, with the vent plug cap (11) removed, showing the internal structure of the vent plug.

FIG. 4 is a horizontal section of the vent plug with an alternate design of the liquid-gas separation system.

FIG. 5 is a section taken along the line 5—5 in FIG. 1.

FIG. 6 is a section taken along the line 6—6 in FIG. 1.

FIG. 7 is an elevational view of the vent plug assembly for the first embodiment.

FIG. 8 is a vertical section through the center of the vent plug assembly having the second embodiment flame arresting system, fully inserted in a vent well of a conventional battery cover.

FIG. 9 is an enlarged section taken from FIG. 8.

For the purpose of describing various aspects of the invention, the flame arresting features will be discussed first and then the liquid-gas separation system inside the vent plug assembly will be discussed.

FLAME ARRESTING FEATURES

Figure 1:
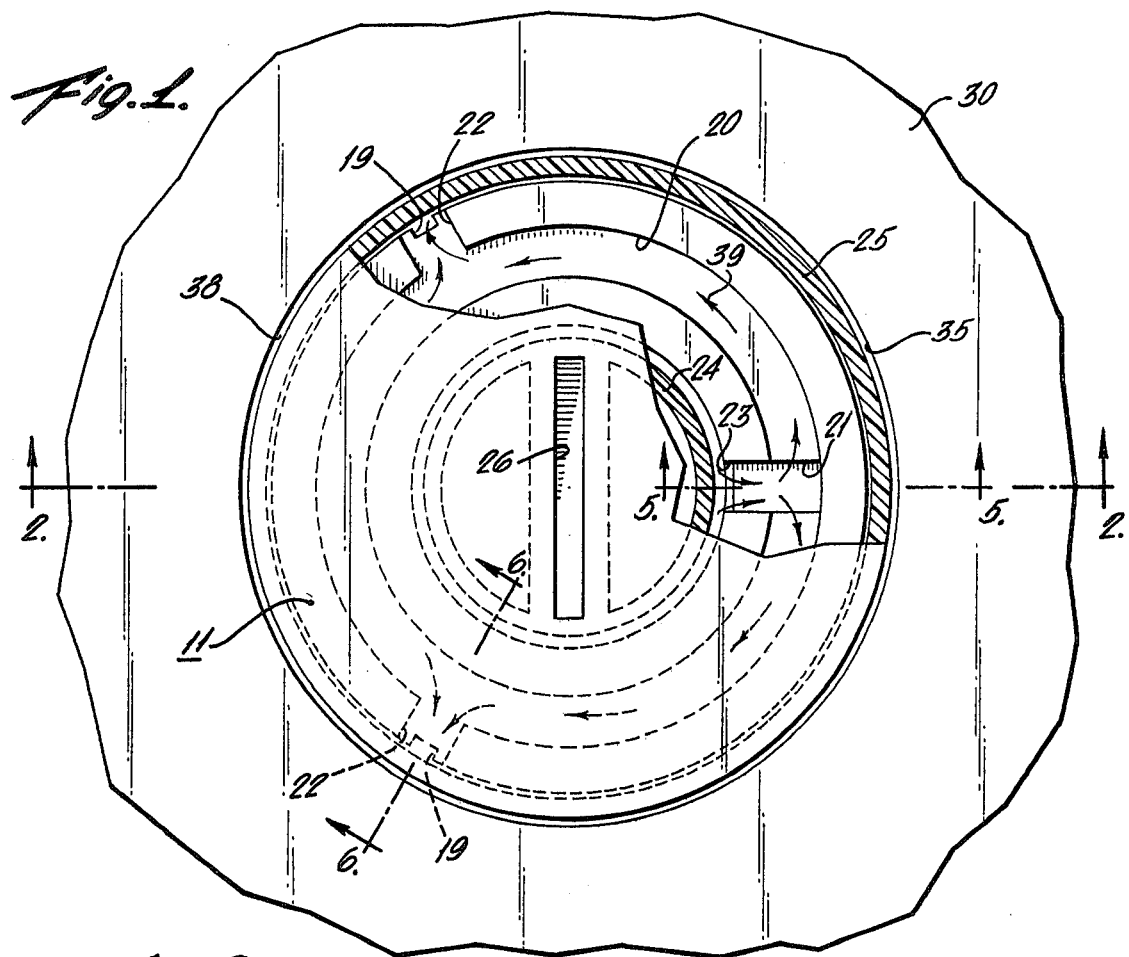
FIG. 1 is a top view having a partial section of the vent plug assembly of the first embodiment inserted in a modified vent well.
Figure 2:
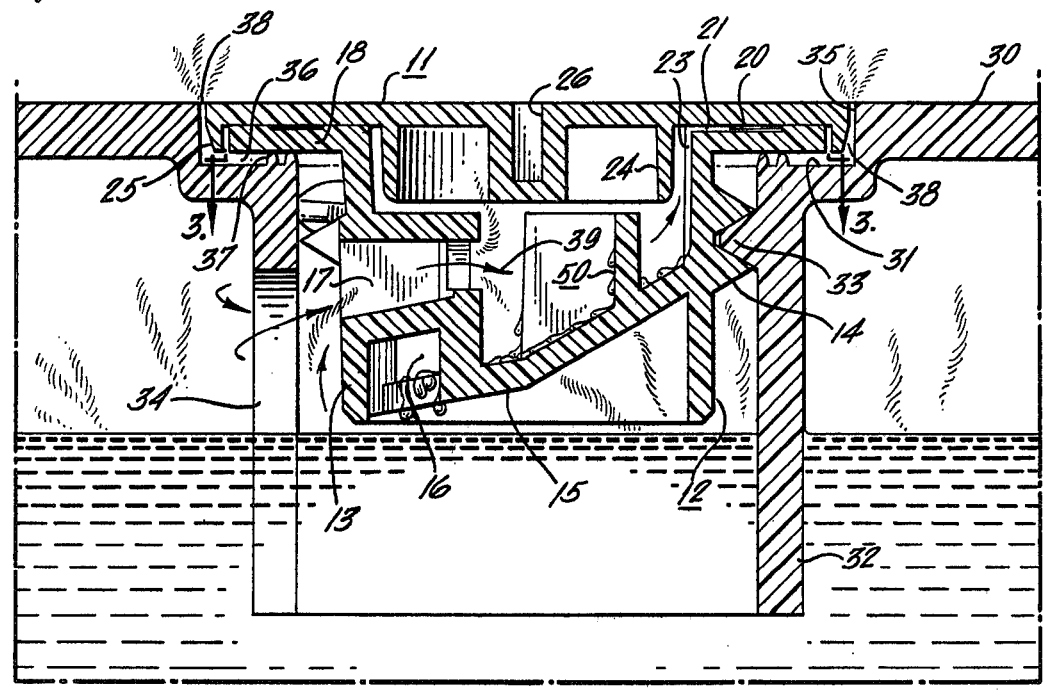
FIG. 2 is the full vertical section through the center of the vent system of FIG. 1.

Referring to FIGS. 1-7, which illustrate the first embodiment flame arresting features, the vent plug assembly can be assembled from two sections, cap 11 and base 12. As can be seen in FIG. 2, base 12 includes a cylindrical body portion 13 with threads 14 formed along its outside surface. A slanted bottom portion 15 is provided with two drain openings 16. (Only one drain opening 16 is shown in the drawings, with the other drain opening being located directly opposite the one illustrated, in a symmetrical manner.) An inlet opening 17 is provided on the sidewall of body portion 13. The upper portion of body portion 13 has an outwardly extending flange portion 18, over which cap 11 fits. Notches 19, located on the outer edge of flange 18, cooperate with the outer skirt of cap 11 to provide exhaust ports for the vent plug assembly which direct the flow of vented gases downwardly. A restricted passage connects the inside enclosure of body portion 13 to notches 19 and serves to prevent transmission of a flame into the vent plug. This restricted passage includes circular recess 20 in the upper section of flange portion 18, with radially extending recesses 21 and 22 extending from recess 20 for connecting it to the inside of body portion 13 and notches 19, respectively (see FIG. 3). The thickness of this restricted passage is selected to be narrow enough to prevent the passage of flame therethrough. In addition, a vertical recess 23 is provided on the inside wall of cylindrical section 13, for reasons which will become apparent later.

Cap 11 has a flat upper surface, which remains flush with the top of the battery cover, and inner and outer, downwardly extending skirts. For the purpose of this discussion and interpretation of the following claims, it is assumed the battery is in its normal, upright position for use, with the battery cover being the top of the battery. Inner skirt 24 is designed to fit fairly close to the inside wall of body portion 13 and outer skirt 25 is designed to fit fairly close around the outside lateral side of flange section 18. Since most of the non-recessed area on the upper portion of flange portion 18 is used to seal cap 11 to base 12, fluid flow through flange portion 18 is restricted to the recessed area (restricted passage), as will be more thoroughly discussed below.

The distinction between the first embodiment and the second embodiment lies in the amount outer skirt 25 extends down below the bottom level of flange portion 18. In the first embodiment, the lower edge of outer skirt 25 is essentially flush with the bottom level of flange portion 18. However, the lower edge of outer skirt 25 extends somewhat below flange portion 18 in the second embodiment. The two designs are required since the first embodiment is designed for use primarily on a maintenance free battery with the vent plug top being flush with the top of the battery cover and the second embodiment is designed for use with a battery having a conventional cover and vent well design, wherein the vent plugs can be routinely removed to examine the electrolyte level in each cell.

A slot 26 is molded into cap 11 to facilitate easy removal of the flush mounted vent plugs of the first embodiment, whereby the internal cells of the maintenance free battery can be reached for testing or in the event of vehicle electrical system malfunction.

The flame arresting function of the vent plug assembly is accomplished in conjunction with the battery cover design. For the first embodiment, referring to FIG. 2, the battery cover 30 has a vent well with a recessed, circular shoulder 31 for receiving flange portion 18 of the vent plug assembly, and a bore defined by sidewall 32 having threads 33 on its inside surface, for receiving body portion 13 and securing the vent plug assembly in the vent well. In the event the electrolyte level is above the lower portion of sidewall 32, breather slot 34 prevents the build-up of gas pressures in the upper portion of a cell around sidewall 32 by allowing the gases to reach the vent plug for relief.

As can be seen in FIG. 2, an explosion chamber is formed in annular space 36 between shoulder 31 and upper sidewall 35, and the outside edge of outer skirt 25 of cap 11 and flange portion 18. The particular size of this explosion chamber is determined by the vertical clearance between shoulder 31 and flange portion 18. Two annular seal rings 37 along the upper surface of shoulder 31 maintain this desired vertical clearance and also act as a seal, as can be seen in FIG. 2. In addition, the outside diameter of shoulder 31 is selected such that the annular space between sidewall 35 and the lateral edge of cap 11 forms a narrow, annular opening 38 through which the gases are ultimately vented to the atmosphere. Preferably, the width of annular opening 38 is large enough to permit the passage of a flame therethrough, so that ignition of the gases in the explosion chamber takes place upon ignition of the gases entering the atmosphere. Another factor is selecting the size of annular opening 38 is that it allow the force of the controlled explosion to be directed to the atmosphere, thereby reducing the forces that must be withstood by the vent well and the vent plug. The net result is that usually the vent plug and vent well sustain little or no damage and can continue to function in their normal manner.

During normal operation of the battery, especially when the battery is being charged, the gases produced from the chemical reactions taking place inside the battery rise to the top of the cells and enter the vent plug assembly through inlet opening 17, and possibly through drain openings 16. Eventually the gases flow through the plug enclosure and into the annular space between the inside sidewall of body portion 13 and inner skirt 24 of cap 11, eventually reaching notches 19 through the restricted passage defined by recesses 23, 21, 20 and 22, as is illustrated by arrows 39. However, because of the placement of the vent plug assembly within the modified vent well, the vented gases must pass through annular space 36 before entering the atmosphere at annular opening 38.

In the event a spark should occur near the gases being vented at opening 38, and combustion results, the potential for exploding the battery could be very real. However, the flame proceeds into annular space 36, where its progress is stopped by the restricted passage. The resulting rapid expansion of the gases in the explosion chamber causes a controlled explosion to take place, thereby extinguishing the flame. The pressure from the controlled explosion is relieved to atmosphere through annular opening 38, thereby minimizing the amount of harm to the vent plug assembly and battery cover. The potentially dangerous situation has now been completely eliminated.

Furthermore, a backup flame arresting means can be provided such that in the event a flame reaches the space between cap 11 and the upper surface of flange 18, cap 11 will melt if it is made from material with a low melting point, thereby extinguishing the flame.

By way of example, and not for limitation, the following dimensions of a typical vent system are provided. In a vent plug with a cap diameter of 3.15 cm, a typical horizontal cross sectional size for notches 19 could range from 0.71 to 1.23mm$^2$ each, with the volume of the explosion chamber, annular space 36, ranging from 0.19 to 0.65 cm$^3$. Annular opening 38 between the edge of cap 11 and sidewall 35 can have a radial width of approximately 0.25 to 0.51 mm., forming an average cross sectional area of 2.5 to 5.62 mm$^2$. The cross-sectional area of the internal, restricted passage (recesses 20, 21, 22 and 23) can range from 0.187 to 0.271 mm$^2$, with a thickness ranging from 0.076mm to 0.18mm.

Several tests have been conducted in accordance with the guidelines established by Battery Council International to prove the feasibility of this vent system design. In one test, several vent systems, vent plugs properly secured in their respective modified vent wells, were connected to a flow of gas generated from a 12 volt lead-acid automobile battery being overcharged at up to 40 amps. Sparks were created near the point of gas discharge (annular opening 38), causing a small explosion at each spark ignition. No propagation of the flame through the vent plug took place in 25 separate spark ignitions of the vented gas, thereby indicating a battery explosion was avoided each time.

A second set of tests were conducted under the same test conditions with vent plugs having restricted passages with different thicknesses. With restricted passage thicknesses ranging from 0.076mm to 0.152mm, 85% of the ignitions resulted in harmless controlled explosions. However, with a restricted passage thickness above 0.18mm, the controlled explosion rate fell to 35% of the total ignitions.

It should also be noted that the size of the explosion chamber may be easily adjusted by making shoulder 31 deeper, increasing the height of sealing rings 37, or adding a washer between rings 37 and flange portion 18.

The vent system with the second embodiment flame arresting system utilizes the same flame arresting concepts of the first embodiment, but can be used without modifying the conventional battery cover design. This embodiment is illustrated in FIGS. 8 and 9 wherein the features like those shown for the first embodiment are labeled with the same numeral bearing a prime designation.

A conventional automotive lead-acid battery is housed in a container with a cover having vent plug wells for each respective cell of the battery. The particular vent plug well used for illustrative purposes is shown in FIG. 8 having threads 41 located around its inside surface, with a chimney 42 extending above the top of cover 30'.

In order to provide this flame arresting ability, the vent plug assembly of the first embodiment is modified by extending outer skirt 25 of cap 11 down below flange portion 18 a predetermined distance to form extended outerskirt 25', as shown in FIGS. 7 and 8. As can be seen in these figures, an annular space 36' is created between the outside surface of chimney 42 and the top of cover 30', and the inside surface of outer skirt 25' and the lower surface of flange portion 18' thereby forming the explosion chamber for the second embodiment.

The basic operation of the vent system of the second embodiment remains nearly the same as that in the first embodiment. As gases (see FIG. 9) rise in the individual cells of the battery, they enter their respective vent plug enclosures through openings 16 and 17. The gases eventually reach annular space 36', as discussed above, and flow into the atmosphere through annular opening 38' (see arrows 44'), which is bounded at the top of cover 30' and lower edge of outer skirt 25'.

The basic dimensions of the modified vent plug remain the same as that provided above for the vent plug used in the first embodiment. However, in the modified vent plug, outer skirt 25' can extend approximately 0.48 to 0.49 cm below the lower surface of flange portion 18', with the end of skirt 25' being approximately 0.76 to 0.77 mm. above cover 30'.

Results from tests conducted on this embodiment according to procedures similar to that discussed above for the first embodiment have indicated that the vent system of the second embodiment is nearly as effective, and still provides meaningful protection from battery explosions caused from external ignition of the vented gases.

In addition to the above embodiments of the flame arresting systems, other variations of the battery cover and vent plug designs can be made to provide a flame arresting system operating on the same principles. For instance, the battery cover could be molded to have a skirt extending above the battery cover, which would serve the function of sidewall 35 in the first embodiment, or skirt 25' in the second embodiment. The discharge port (38) would then be the annular space between the upper end of this skirt and the lateral side of cap 11.

LIQUID-GAS SEPARATION

Another important function of a vent system is to separate the liquid electrolyte that is combined with the gases that are vented through the vent plug, so as to make the most efficient use possible of the available electrolyte in a given battery. This is especially important since maintenance free batteries are by name designed so as to not require the addition of electrolyte or water to the electrolyte throughout the life of the battery. Use of a vent cap which removes any electrolyte from the escaping gases produced from the internal chemical reactions of the battery, helps to reduce the total consumption of electrolyte throughout a battery's life, and also reduces contamination of the top of the battery. Another consideration for a maintenance free battery is that the individual cells of a battery are filled as full as possible to provide the longest battery life possible. Design problems for such a vent plug are further complicated by the marketing requirement that the vent plugs not extend above the top of the battery cover. Therefore, a vent plug assembly which meets these requirements, by necessity, must have a low profile.

Referring to FIGS. 2 and 3, "T" shaped baffle 50 extends upward from bottom portion 15 directly in front of inlet 17. Diagonal baffles 51 extend from the internal sidewall of body portion 13 and also from bottom portion 15 on either side of "T" shaped baffle 50. Baffles 50 and 51 are arranged with respect to each other, inlet 17, and drain openings 16 such that nearly all of the flowing gases are diverted to provide maximum surface contact between the fluid entering the vent plug assembly and the baffles, thereby providing maximum separation of the gases and the liquids. This effect is further aided by the close tolerance between inner skirt 24 of cap 11 and the inside surface of body portion 13.

More specifically, when gases are being produced by the internal chemical reactions in the battery, gases combined with liquid electrolyte are forced into the vent plug assembly through inlet opening 17, and possibly drain openings 16, as indicated by arrows 39. A large amount of the fluid entering the vent plug assembly enters through inlet 17 and begins flowing in a horizontal direction. Preferrably, inlet 17 includes a horizontal elongated passage, so as to assure a horizontal flow direction is obtained. The fluid flow travels between the non-attached ends of diagonal baffles 51 along either side of "T" shaped baffle 50 before contacting arms 53 extending from baffle 50. The flowing stream now becomes diffused and swirls around between the baffles before eventually leaving the vent plug enclosure through vertical recess 23. In the process of seeking an exit from the vent plug enclosure, the contact of the fluid stream with the baffles and the internal surfaces of the enclosure produces a scrubbing effect which causes most of the liquid phase in the stream to settle out and flow down bottom portion 15 until it reaches drain opening 16 and returns to the cell below. The gaseous phase continues to flow to the atmosphere, as discussed above, through restricted passages 20, 21 and 22, notches 19, annular space 36 and annular opening 38.

Under most conditions, some gas flow into the vent plug assembly will take place through drain openings 16, but this has little effect on the flow of liquid from vent plug enclosure. In the event the liquid level of the electrolyte should rise sufficiently to reach the lower portion of the vent plug, thereby blocking drain openings 16, relief is still permitted through inlet 17 which is above drain opening 16. As a result, the possibility of building up excessive pressure in a battery cell because of blockage of a vent plug inlet by electrolyte is effectively reduced. A wider safety margin for electrolyte level is thereby produced for the designers of the maintenance free battery.

An alternate design for the liquid-gas separation system is illustrated in FIG. 4, wherein the same elements are identified by the same numeral bearing the letter "a" designation. This alternate design has a different baffle structure for use in small vent plugs for small batteries, which may be used in compact cars, on motorcycles and other low power applications. In place of baffles 50 and 51, one curved baffle 60 is located across from inlet opening 17a, and operates in a manner similar to that discussed above to separate the liquid and gas phases.

This separation system for a vent plug provides an efficient system for reducing the loss of electrolyte, one which can be constructed in a low profile arrangement because the separation takes place in a horizontal direction, thereby eliminating the need for a series of horizontal baffles opposing the vertical flow direction which inherently can take up more space. An additional safety margin, as well as added life, is produced by enabling vapors to be relieved at the uppermost point in each cell. The combination of the low profile separation system with the flame arrestor system of the first embodiment provides a safe, reliable, and efficient vent system for a battery, with an external appearance which is also aesthetically pleasing for marketing purposes.

Furthermore, the same principals are utilized in the vent system of the second embodiment to enable its use on a battery having a conventional vent well design.

For purposes of assembling the two vent plug sections, cap 11 and base 12, any commonly available method may be used, including adhesives, heat sealing, ultrasonic welding, or even snap fitting the two sections together. Another alternative would be to mold base 12 in with battery cover 30 and then secure cap 11 to base 12.

While the above discussion has been directed toward vent systems for batteries wherein the plug assembly is threaded into its respective vent well, it can be appreciated that the concepts taught and inventions claimed also apply to a vent system wherein the vent plug has no threads and can be press fitted into the well. It can also be appreciated that a series of these vent plugs can be secured together to form a multi-gang vent plug assembly. While further modification of the battery cover would be required so that the multi-gang vent plug assembly would be flush with the cover, the connection of a plurality of vent plugs of either embodiment would be within the capabilities of one skilled in the art.

A further consideration which should be noted is that the concepts embodying the invention disclosed and claimed herein, while primarily applicable to batteries, may also be applicable to vent systems in other environments having similar venting requirements, such as in venting hydrocarbons.

While particular embodiments of this invention have been shown and described, it is ovbious that changes and modifications can be made without departing from the true spirit and scope of the invention. It is the intention in the appended claims to cover all such changes and modifications.

I claim:

1. A battery vent system having a flame arresting capability for preventing the propagation of a flame, caused by ignition of flamable gases emitted from the vent system, through the vent system to the inside of the battery, wherein said vent system comprises:
   a. a battery cover which has at least one vent well extending into each cell for permitting access to a battery cell, wherein the vent well has a portion which is recessed below the upper surface level of the battery cover such that upon insertion of the vent plug assembly completely into the vent well, the upper surface of the vent plug assembly is essentially flush with the upper surface of the battery cover;
   b. a vent plug assembly for insertion into the vent well, said vent plug assembly having,
      (i) a body portion for insertion into the vent well, said body portion having a predetermined length;
      (ii) a bottom portion connected to the lower part of the body portion;
      (iii) a cap secured over the upper portion of the body portion, thereby defining an internal enclosure inside the body portion;
      (iv) inlet means for permitting fluid to flow between the internal enclosure and the particular battery cell when the vent plug is inserted into the vent well; and
      (v) exhaust port means in fluid communication with the internal enclosure to exhaust fluid to the atmosphere;
   c. means defining a confined space bounded by the vent plug assembly and the battery cover, whereby said confined space serves as an explosion chamber;
   d. means for providing fluid communication between the confined space and the exhaust port of the vent plug assembly;
   e. a flame transmission prevention means located so that any fluid flowing between the confined space and internal enclosure of the vent plug assembly flows through the flame transmission prevention means, said means being designed such that a flame will not pass therethrough;
   f. a discharge port means for providing fluid communication between the confined space and the atmosphere, wherein said discharge port is small in size compared to the size of the confined space, and whereby gas may be vented from the battery cell, through the internal enclosure, the exhaust port means, the confined space, and into the atmosphere through the discharge port means, and in the event the gas being discharged at the discharge port is ignited, the resulting flame travels to the confined space and creates a controlled explosion to extinguish the flame before it is propagated into the battery cell.

2. The vent system recited in claim 1, wherein:
   a. the vent well has a recessed shoulder surrounding the upper portion of the vent plug well, with a sidewall extending upward from the outer edge of the shoulder to the battery cover; and
   b. the vent plug assembly has a flange portion extending away from the upper portion of the body portion, whereby upon insertion of the vent plug assembly into the vent well, the flange portion is received by the recessed shoulder of the well; and wherein the vent system further comprises:
   c. means for maintaining a predetermined distance between the lower portion of the flange portion of the vent plug and the upper surface of the recessed shoulder of the vent plug well to form the confined space.

3. The vent system recited in claim 1, wherein the distance maintaining means includes at least one sealing ring extending completey around the recessed shoulder surface.

4. The vent system recited in claim 2, wherein the exhaust port of the vent plug assembly is located in the flange portion such that the fluid flow is in a vertical direction.

5. The vent system recited in claim 4, wherein the vent plug cap completely covers the flange portion and includes an outer, downwardly extending skirt surrounding the outside lateral surface of the flange portion of the body portion, which extends down approximately level to the lower surface of the flange portion, and wherein the exhaust port on the vent plug is formed between the skirt of the vent plug cap and the flange portion so that the escaping gases flow in a downward direction into the confined space.

6. The vent system recited in claim 5, wherein the discharge port is defined as the space between the sidewall extending from the recessed shoulder of the vent well and the outer, lateral surface of the vent plug cap.

7. The vent system recited in claim 6, wherein the flame transmission prevention means comprises a restricted passage having a size such that a flame will not pass therethrough.

8. The vent system recited in claim 7, wherein the restricted passage means is located between the flange portion of the body portion and the vent plug assembly cap, so that fluid flow between the internal enclosure and the exhaust port means flows through said restricted passage.

9. The vent system recited in claim 7, wherein the discharge port has a width from 0.25 to 0.51 mm.

* * * * *